C. E. HUTCHINGS.
PHOTOGRAPHIC VIEW FINDER.
APPLICATION FILED JUNE 21, 1918.
1,282,839.
Patented Oct. 29, 1918.
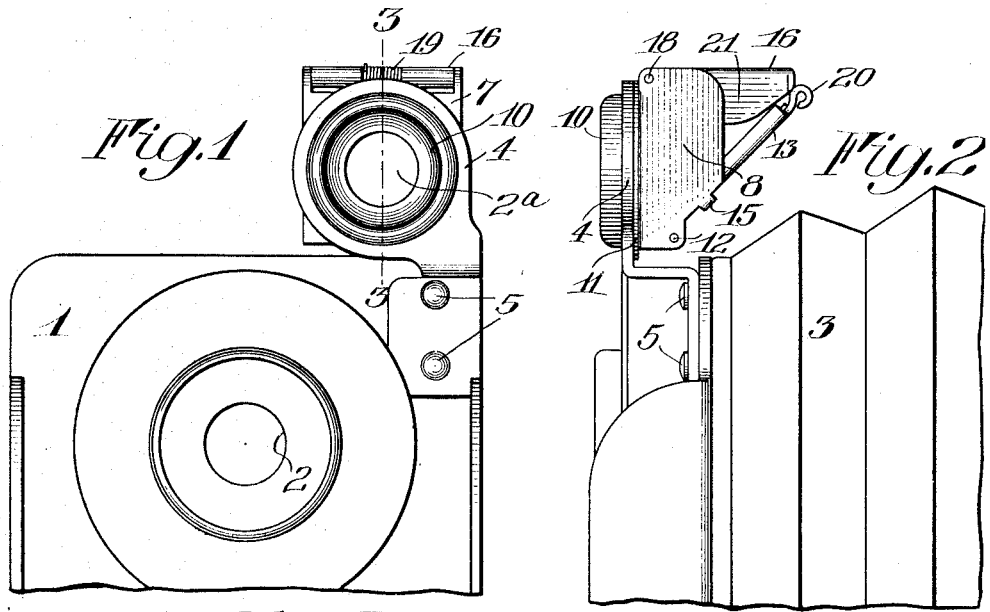
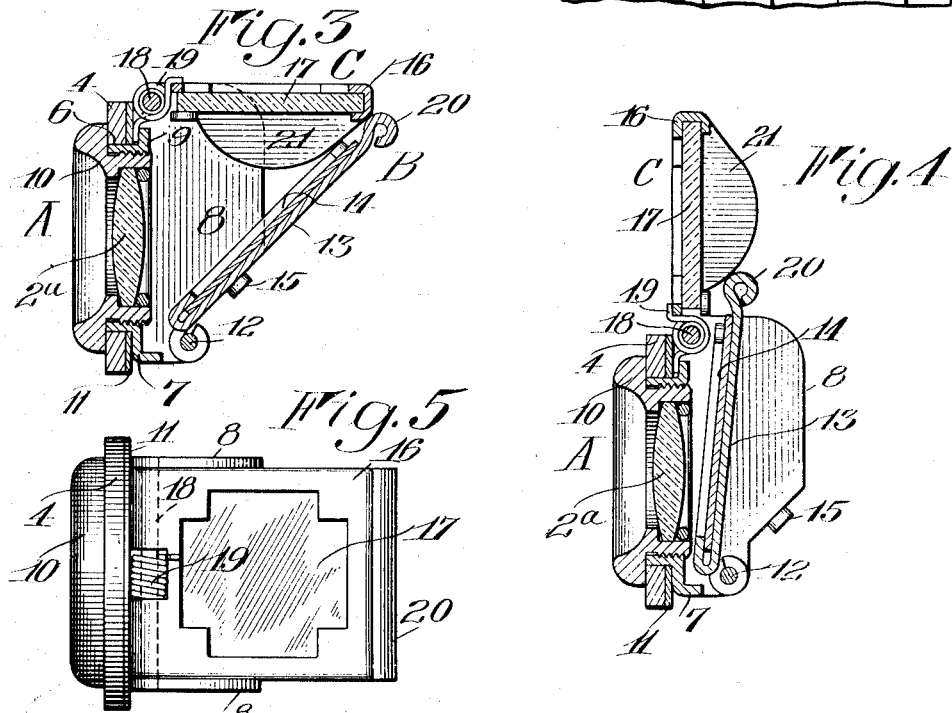
Witnesses:
Nelson H. Copp
Russell B. Griffith
INVENTOR
Charles E. Hutchings
BY
his ATTORNEYS

UNITED STATES PATENT OFFICE.

CHARLES E. HUTCHINGS, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC VIEW-FINDER.

1,282,839. Specification of Letters Patent. Patented Oct. 29, 1918.

Application filed June 21, 1918. Serial No. 241,150.

*To all whom it may concern:*

Be it known that I, CHARLES E. HUTCHINGS, of Rochester, in the county of Monroe and State of New York, have invented certain new and useful Improvements in Photographic View-Finders; and I do hereby declare the following to be a full, clear, and exact description of the same, reference being had to the accompanying drawings, forming a part of this specification, and to the reference-numerals marked thereon.

My present invention relates to photography and more particularly to view finders for photographic cameras and it has for its object to provide a simple, compact and serviceable finder of the folding type particularly adapted for mounting on the sliding fronts of folding cameras to the end that the finder may fold during the folding of the camera so as not to enlarge the bellows chamber into which the front and finder are pushed while at the same time, maintaining a prominent position for the finder on the front and permitting it to be made of fairly large dimensions. To these and other ends the invention resides in certain improvements and combinations of parts all as will be hereinafter more fully described, the novel features being pointed out in the claims at the end of the specification.

In the drawings:

Figure 1 is a front view of a camera front provided with a finder constructed in accordance with and illustrating one embodiment of my invention;

Fig. 2 is a side view thereof;

Fig. 3 is an enlarged central section through the finder, taken substantially on the line 3—3 of Fig. 1;

Fig. 4 is a similar view but with the parts in folded positions, and

Fig. 5 is a top plan view on the enlarged scale of Figs. 3 and 4.

Similar reference numerals throughout the several views indicate the same parts.

Only portions of the sliding front and of the bellows of the familiar type of folding hand camera is shown, 1 indicating the front or lens board; 2 the lens opening therein, and 3 the bellows at the rear of the front. The finder is supported, in the present instance, upon a forwardly offset bracket arm 4 secured to the front at 5 and having a circular opening 6 (Fig. 3) therein forming, if desired, a bearing for the rotatable mounting of the finder. The latter embodies a front plate 7 having rearwardly turned side flanges 8 and a central opening from which extends a surrounding collar 9 occupying the opening 6 of the bracket arm and which holds the said front plate to the latter at the rear while a shouldered lens tube 10 threaded into the collar is tightened against the bracket arm at the front. A wear plate and tension member 11 in the form of a spring washer is preferably interposed between the front plate 7 and the bracket arm 4. The parts just described, including the front plate 7 and lens $2^a$ constitute what I term the collecting element of the finder indicated generally by A, the lens $2^a$ being a collecting lens that projects the view desired.

At the bottom of the collecting element and supported in the side flanges 8 is a hinge pintle 12 upon which is mounted a frame 13 for the inclined mirror 14. The frame is supported in its inclined position by lugs 15 on the side flanges 8 but is adapted to move forwardly to an inoperative position in rear of and parallel with the collecting element A. The mirror frame and mirror I term the reflecting element designated generally by B.

The observing element, indicated generally as C, in which the operator observes the image, comprises in the present instance, a frame 16 carrying a ground glass screen 17 upon which the projected image is reflected from mirror 14 as usual. This frame swings on a pintle 18 supported between the flanges 8 at the top of the element A and surrounding the pintle is a spring 19 that engages the frame to hold it in a horizontal position and against the mirror frame 13 with a resulting pressure that also holds the mirror frame properly inclined against its lugs 15 as in Fig. 3. A rolled edge 20 at the rear or upper end of the mirror frame projects rearwardly of the frame 16 and is adapted to ride on cam shaped depending side flanges 21 on frame 16 as the frame 13 is swung forwardly.

In the operation of the device, during the folding of the camera, the rolled edge 20 of the mirror frame comes in contact with some suitable abutment which folds it forwardly as described, and simultaneously, through the engagement of the said rolled edge with the cam flanges 21, the observing element C is rocked to a vertical position as shown in Fig. 4, above and substantially in the plane of the collecting element A, the reflecting element B being also substantially parallel to the other parts and against the rear of the element A. In this folded position of Fig. 4, it will be seen that the finder occupies a very limited depth from front to rear of the camera. As the camera front is drawn out again, the spring 19 projects both the element C and the element B to operative positions.

In addition to serving as cams, the side flanges 21 of the top frame 16 serve with the side flanges 8 of the collecting element to house the parts and exclude the entrance of any considerable volume of light otherwise than through the lens 2ª.

I claim as my invention:

1. In a folding view finder, the combination with a forwardly arranged collecting element, of an angularly disposed reflecting element at the rear thereof pivoted to the bottom of the collecting element and an observing element pivoted to the top of the collecting element to turn on a fixed axis.

2. In a folding view finder, the combination with a forwardly arranged collecting element, of an angularly disposed reflecting element at the rear thereof pivoted to the bottom of the collecting element to fold forwardly parallel with the latter and an observing element pivoted to the top of the collecting element to fold forwardly on a fixed axis into parallelism with the other elements.

3. In a folding view finder, the combination with a forwardly arranged collecting element, of an observing element having a fixed pivotal connection with the top thereof and adapted to fold forwardly above the same and in parallelism therewith and an angularly disposed reflecting element at the rear of the collecting element pivoted to the lower portion of the latter to fold forwardly against the same and coöperating with the observing element to simultaneously actuate it to folded position.

4. In a folding view finder, the combination with a forwardly arranged collecting element, of an observing element having a fixed pivotal connection with the top thereof and adapted to fold forwardly above the same and in parallelism therewith, said element being provided with laterally depending cam-shaped side flanges, and an angularly disposed reflecting element at the rear of the collecting element pivoted to the lower portion of the latter to fold forwardly against the same and coöperating with the side flanges of the observing element to simultaneously actuate it to folded position.

CHARLES E. HUTCHINGS.